Apr. 17, 1923.

M. TOCCHIO

COOKING GRILL

Filed March 7, 1922

1,451,971

Witnesses.
H. P. P. Bayly.
E. W. Bayly.

Inventor.
Michele Tocchio,
per John Pitt Bayly.
Attorney.

Patented Apr. 17, 1923.

1,451,971

UNITED STATES PATENT OFFICE.

MICHELE TOCCHIO, OF HAMMERSMITH, LONDON, ENGLAND.

COOKING GRILL.

Application filed March 7, 1922. Serial No. 541,826.

*To all whom it may concern:*

Be it known that I, MICHELE TOCCHIO, a subject of the King of Italy, residing at 126 Dalling Road, Hammersmith, in the county of London, in England, have invented a new and useful Improvement in or Relating to Cooking Grills, of which the following is a specification.

This invention relates to cooking grills and has for its object to provide a grill more economical than those hitherto used, and which will admit of both sides of the joint to be grilled being cooked simultaneously.

Figure 1:
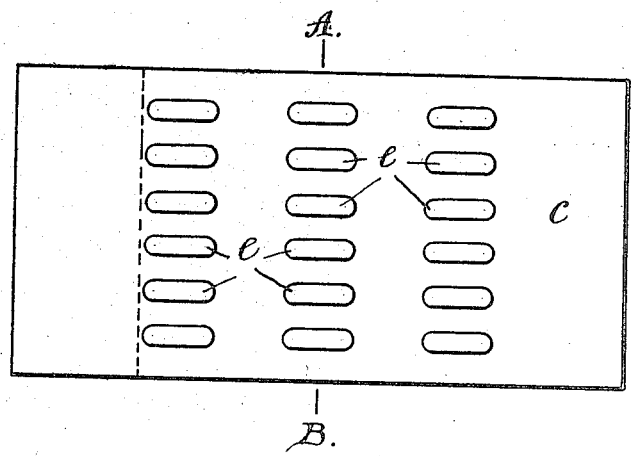
Figure 2:
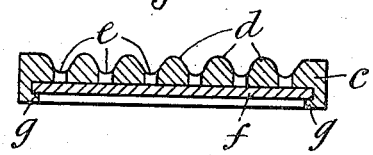
Figure 3:
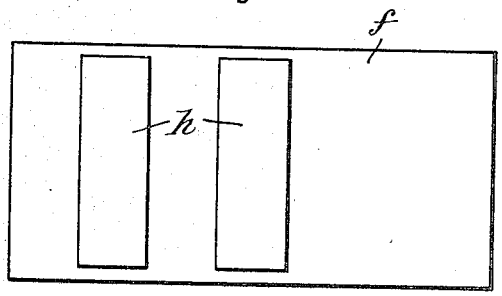

According to my invention the joint is placed upon a corrugated metal piece adapted to be heated before the joint is placed upon it, and of sufficient mass to cook the under side of the joint by the heat previously absorbed by it. The troughs of the corrugations are provided with elongated holes and the lower side of the piece is provided with a shutter adapted to close the holes while the piece is being heated. One form of the invention is illustrated in the accompanying drawings in which, Fig. 1, shows a plan view of the metal piece; Fig. 2, shows a section on the line A—B, of Fig. 1, and Fig. 3, shows a plan of the shutter.

The metal piece $c$, Figs. 1 and 2, is provided with corrugations $d$ having elongated holes $e$ in the troughs of the corrugations. The under side of the piece $c$ is provided with slides $g$ adapted to receive a shutter $f$, Figs. 2 and 3.

The shutter $f$ has openings $h$, each of which is adapted to register with a transverse series of elongated holes $e$ in the piece in one position of the slide, and in the other position of the slide the solid portions close the holes.

The piece and shutter are provided with handles.

I claim:

An appliance for a cooking grill, consisting of a corrugated metal piece having perforations, and provided with slides on the underside to receive a shutter adapted to close or open the holes.

MICHELE TOCCHIO.